(12) United States Patent
Imai

(10) Patent No.: US 11,797,499 B2
(45) Date of Patent: Oct. 24, 2023

(54) INFORMATION PROCESSING SYSTEM AND METHOD

(71) Applicant: CANON KABUSHIKI KAISHA, Tokyo (JP)

(72) Inventor: Tetsu Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/712,595

(22) Filed: Apr. 4, 2022

(65) Prior Publication Data

US 2022/0318212 A1  Oct. 6, 2022

(30) Foreign Application Priority Data

Apr. 5, 2021 (JP) ................................ 2021-064277

(51) Int. Cl.
  *G06F 16/00* (2019.01)
  *G06F 16/21* (2019.01)
  *G06F 16/38* (2019.01)

(52) U.S. Cl.
  CPC ............ *G06F 16/214* (2019.01); *G06F 16/38* (2019.01)

(58) Field of Classification Search
  CPC ............................. G06F 16/214; G06F 16/38
  See application file for complete search history.

(56) References Cited

U.S. PATENT DOCUMENTS

| | | | |
|---|---|---|---|
| 9,460,028 B1* | 10/2016 | Raizen | G06F 3/0617 |
| 10,496,291 B2* | 12/2019 | Badrinarayanan | G06F 21/64 |
| 2007/0106841 A1* | 5/2007 | Stewart | G06F 3/0607 |
| | | | 711/112 |
| 2018/0052987 A1 | 2/2018 | Tada et al. | |
| 2021/0034275 A1* | 2/2021 | Venkatanarayanan | |
| | | | G06F 3/0617 |

FOREIGN PATENT DOCUMENTS

| | | |
|---|---|---|
| JP | 2018022501 A | 2/2018 |
| JP | 2020119147 A | 8/2020 |

* cited by examiner

*Primary Examiner* — Diedra McQuitery
(74) *Attorney, Agent, or Firm* — Venable LLP

(57) ABSTRACT

An information processing system determines whether the destination tenant corresponding to the source tenant is present, newly generates the destination tenant if the destination tenant is determined to be absent, and determines whether a destination resource which has the same ID as a source resource included in the source tenant is included in the tenant of the destination service. The system newly generates the destination resource in the destination tenant when the destination resource is determined not to be included in the tenant of the destination service, directly migrates data of the source resource to the destination resource if the tenant including the destination resource is the destination tenant, and migrates the data of the source resource to the destination resource via a dummy resource if the tenant including the destination resource is not the destination tenant.

9 Claims, 10 Drawing Sheets

INFORMATION PROCESSING SYSTEM AND METHOD

BACKGROUND OF THE INVENTION

Field of the Invention

The present invention relates to an information processing system and a method and, more particularly, to data migration and integration between services.

Description of the Related Art

Conventionally, there is a technique that facilitates cooperation between a plurality of services, whose content is managed by IDs, by preparing a common ID for linking the different IDs of the respective services. In Japanese Patent Laid-Open No. 2018-022501, authentication in service cooperation is facilitated by preparing a common server that links and manages different IDs of a plurality of services, a common user ID, and client IDs.

In addition, in a tenant isolated service that manages tenants and resources by linking the resources to respective tenants, there is a technique for transferring the resource to a different tenant. In Japanese Patent Laid-Open No. 2020-119147, when a device linked to a tenant is to be transferred to another tenant, authority management during device transfer is performed smoothly by holding a piece of transfer-destination tenant information in an authorization server and including the transfer-destination tenant in the response to the authorization request from the device.

Assuming that a tenant-isolated service that manages tenants and resources by linking resources to respective tenants is present, there can be a case in which data integration between a plurality of services is performed for service reorganization due to operation issues or for data migration to a new service that is being developed. In such a case, if there are tenants which are used by the same user before the integration, it is preferable to integrate and inherit the data even if the services are different.

As described above, there is a technique for managing a common ID between a plurality of services. However, when a service that manages tenants and resources linked to the tenants is present, it is possible to consider a case in which tenant structures differ between services. If each resource has a unique resource ID and each tenant which is not linked between services includes a resource which has a resource ID, it is difficult to determine whether the resource ID or the linking of the resource to each tenant is to be prioritized for service cooperation.

Furthermore, as described above, although there is a technique for transferring a resource held by a tenant to another tenant, there is no description of transfer across services. Since the resource held in the service will change when the resource is transferred to a location which is not a transfer destination, it is difficult to cope with a case in which a resource whose resource ID overlaps that of the resource being transferred to a location which is not a transfer destination is present.

SUMMARY OF THE INVENTION

The present invention facilitates service integration and securely performs service integration.

The present invention comprises the following arrangement. That is, according to an aspect of the present invention, provided is an information processing system that causes a migration-source tenant as a tenant of a migration-source service to migrate to a migration-destination tenant as a tenant of a migration-destination service corresponding to the migration-source tenant, the information processing system comprising one or more processors and one or more memories storing one or more programs to be executed by the one or more processors, wherein the executed one or more programs cause the information processing system to: determine whether the migration-destination tenant corresponding to the migration-source tenant is present or absent, newly generate the migration-destination tenant when the migration-destination tenant is determined to be absent, determine whether a migration-destination resource which has the same ID as a migration-source resource included in the migration-source tenant is included in the tenant of the migration-destination service, newly generate the migration-destination resource in the migration-destination tenant when the migration-destination resource is determined not to be included in the tenant of the migration-destination service, and migrate data of the migration-source resource to the migration-destination resource, wherein to migrate includes directly migrating the data of the migration-source resource to the migration-destination resource if the tenant including the migration-destination resource is the migration-destination tenant, and migrating the data of the migration-source resource to the migration-destination resource via a dummy resource generated in the migration-destination tenant if the tenant including the migration-destination resource is not the migration-destination tenant.

In addition, according to another aspect of the present invention, provided is a method of an information processing system that migrates a migration-source tenant as a tenant of a migration-source service to a migration-destination tenant as a tenant of a migration-destination service corresponding to the migration-source tenant, the method comprising: determining whether the migration-destination tenant corresponding to the migration-source tenant is present or absent; newly generating the migration-destination tenant when the migration-destination tenant is determined to be absent; determining whether a migration-destination resource which has the same ID as a migration-source resource included in the migration-source tenant is included in the tenant of the migration-destination service; newly generating the migration-destination resource in the migration-destination tenant when the migration-destination resource is determined not to be included in the tenant of the migration-destination service, directly migrating data of the migration-source resource to the migration-destination resource if the tenant including the migration-destination resource is the migration-destination tenant; and migrating the data of the migration-source resource to the migration-destination resource via a dummy resource generated in the migration-destination tenant if the tenant including the migration-destination resource is not the migration-destination tenant.

According to the present invention, service integration can be facilitated and performed securely.

Further features of the present invention will become apparent from the following description of exemplary embodiments with reference to the attached drawings.

DESCRIPTION OF THE EMBODIMENTS

First Embodiment

Figure 1:
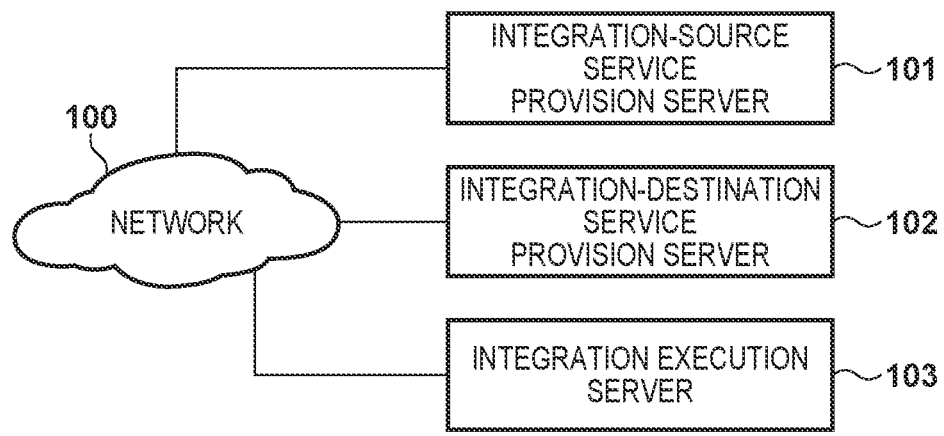
FIG. 1 is a block diagram showing an example of a system arrangement and a network arrangement for implementing the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

An information processing system according to this embodiment is applied to an information processing system that includes an integration-source service provision server, an integration-destination service provision server, and an integration execution server. Note that the integration-source service provision server and the integration-destination service provision server each have a function for managing a plurality of tenants, a plurality of resources linked to the tenants, and a plurality of resource data linked to the resources. More specific examples of a resource are a PC, a smartphone, a tablet, an image forming apparatus, a smartwatch, a digital camera, and the like. An image forming apparatus includes, for example, a printer, a multifunction peripheral (MFP), and the like.

However, the integration-source service provision server and the integration execution server may be the same server. Alternatively, the integration-destination service provision server and the integration execution server may be the same server.

In this embodiment, assume that the integration-source service and the integration-destination service each have a function for managing a plurality of tenants. In addition, the integration-source service and the integration-destination service each have a function for managing tenants and resources by linking a plurality of resources to each tenant, and a user of the integration-source service and the integration-destination service cannot obtain or view data related to a resource other than that of the tenant to which the user belongs. The integration-source service and the integration-destination service also has a function for managing resources by linking a plurality of resource data to each resource. Furthermore, a specification in which a resource has a unique resource ID and a plurality of resources that have overlapping resource IDs cannot be registered in the same service will be assumed in this embodiment.

An example of tenant management information which is to be managed by the integration-source service and integration-destination service is shown hereinafter.

Example 1. Tenant Management Information

```
{
  "TenantId": "BEF0001",
  "CustomerName": "MyCompany",
  "MailAddress": "my-company@mail.address",
  "Language": "Japanese"
  "Contract": {
  "Data": "2020/6/1",
  "Name": "MyDistributor"
  "MailAddress": "my-distributor@mail.address",
  }
}
```

In this manner, the tenant management information includes a tenant ID, a client name, an email address, a language to be used, contract information, and the like.

An example of the resource management information which is linked to a tenant and is to be managed by the integration-source service and integration-destination service is shown hereinafter.

Example 2. Resource Management Information

```
{
  "ResourceID": "RSC0001",
  "TenantId": "BEF0001",
  "ResourceName": "MyResource",
  "ProductName": "RSC-0001",
  "ResourceType": "Personal Computer",
}
```

In this manner, the resource management information includes a resource ID, a belonging tenant ID, a resource name, a product name, and a resource type. The resource management information is generated at the generation of a resource, and the value of each item can be the value designated during the generation.

An example of resource data management information which is linked to a resource and is to be managed by the integration-source service and integration-destination service is shown hereinafter.

Example 3. Resource Data Management Information

```
{
  "ResourceDataID": "DAT0001",
  "ResourceID": "RSC0001",
  "TenantId": "BEF0001",
  "ResouceDataPath": "/rcsdata/BEF0001/RSC0001/DAT0001.zip",
  "Date": "2020/6/30",
```

-continued

```
    "Containts": [
      "settings", "address_book", "application_licenses"
    ]
}
```

In this manner, the resource data management information includes a resource data ID, a resource ID, a tenant ID, a location of the resource data, a date, and display of contents.

Figure 11:
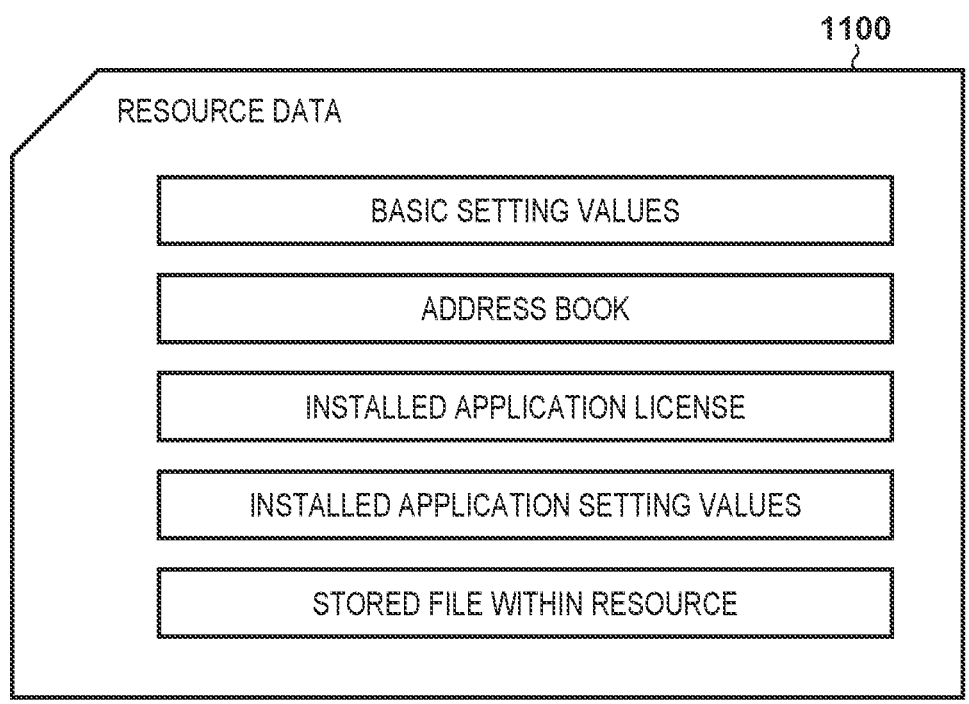
FIG. 11 is a view showing a sample of resource data.

Furthermore, FIG. 11 shows an example of resource data linked to a resource. FIG. 11 exemplifies a case in which a multifunction peripheral (MFP) is the resource. In this example, resource data 1100 includes, for example, a basic settings book which includes various kinds of basic settings of the apparatus and an address book which includes transmission destinations and contacts. Furthermore, the resource data 1100 also includes an application license installed in the apparatus as a resource and the installed application setting values. The resource data 1100 can also include a resource file stored in the apparatus. The resource data is, as a matter of course, data that corresponds to the type of the resource or the type of the device if a device is used. As described above, the resource data is associated with the resource by the resource data management information.

System Arrangement

FIG. 1 is a block diagram showing an example of the system arrangement and the network arrangement for implementing the present invention.

An integration-source service provision server 101 has a function for managing a plurality of tenants, a plurality of resources linked to the tenants, and a plurality of resource data linked to the resources. In addition, the integration-source service provision server 101 can communicate with an external device such as an integration execution server 103 or the like via a network 100.

An integration-destination service provision server 102 has a function for managing a plurality of tenants, a plurality of resources linked to the tenants, and a plurality of resource data linked to the resources. In addition, the integration-destination service provision server 102 can also communicate with an external device such as the integration execution server 103 via the network 100.

The integration execution server 103 executes service integration processing by transmitting an operation instruction to the integration-source service provision server 101 and the integration-destination service provision server 102 via the network 100. Note that the present invention can be applied even in an arrangement in which the integration-source service provision server 101 and the integration execution server 103 are arranged in the same server. The present invention can also be applied even in an arrangement in which the integration-destination service provision server 102 and the integration execution server 103 are arranged in the same server.

Figure 2:
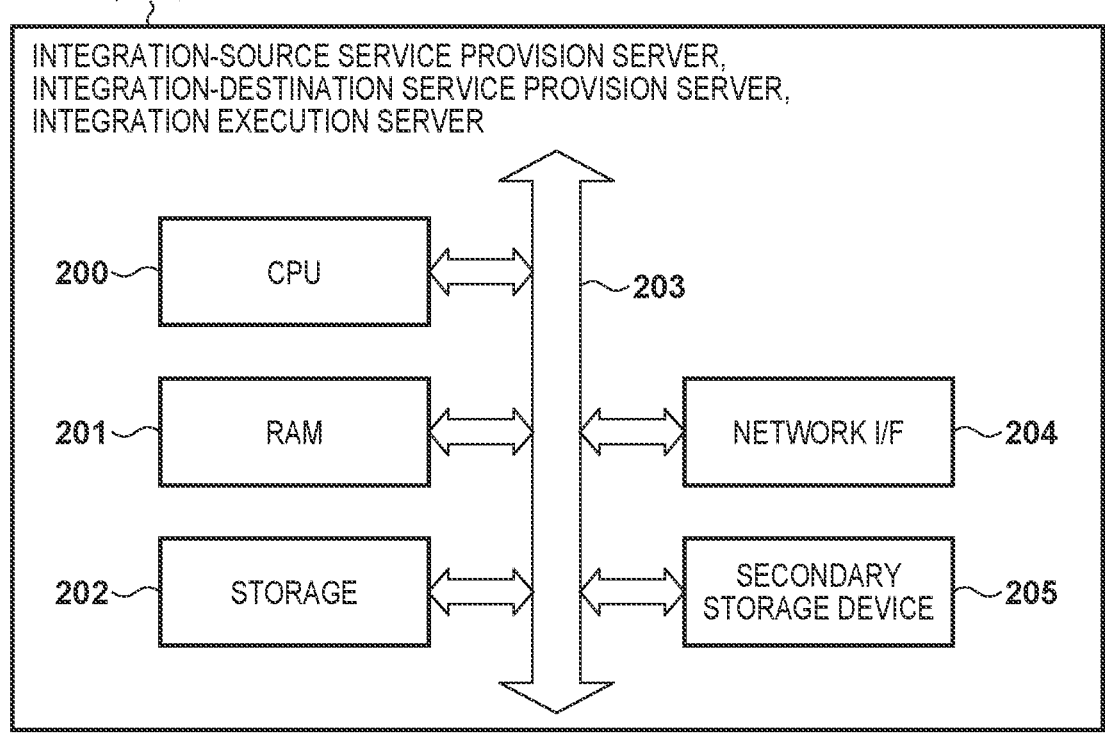
FIG. 2 is a view showing the hardware arrangement of an integration-source service provision server, an integration-destination service provision server, and an integration execution server.

FIG. 2 is a view showing the hardware arrangement of each of the integration-source service provision server 101, the integration-destination service provision server 102, and the integration execution server 103. A RAM 201 is a temporary memory area. A storage 202 stores embedded programs and data. A network interface 204 connects to the network to communicate with other computers and network devices. A secondary storage device 205 is a secondary storage device such as an HDD, a flash memory, or the like. A CPU 200 processes data or inputs/outputs data by executing programs loaded from the RAM 201, the storage 202, and the secondary storage device 205. Each unit is connected by a system bus 203. In this embodiment, unless otherwise mentioned, assume that the system bus 203 is a bus that propagates a control instruction from the CPU 200 to each piece of hardware connected to the system bus 203.

Functional Arrangement of Each Server

Figure 3:
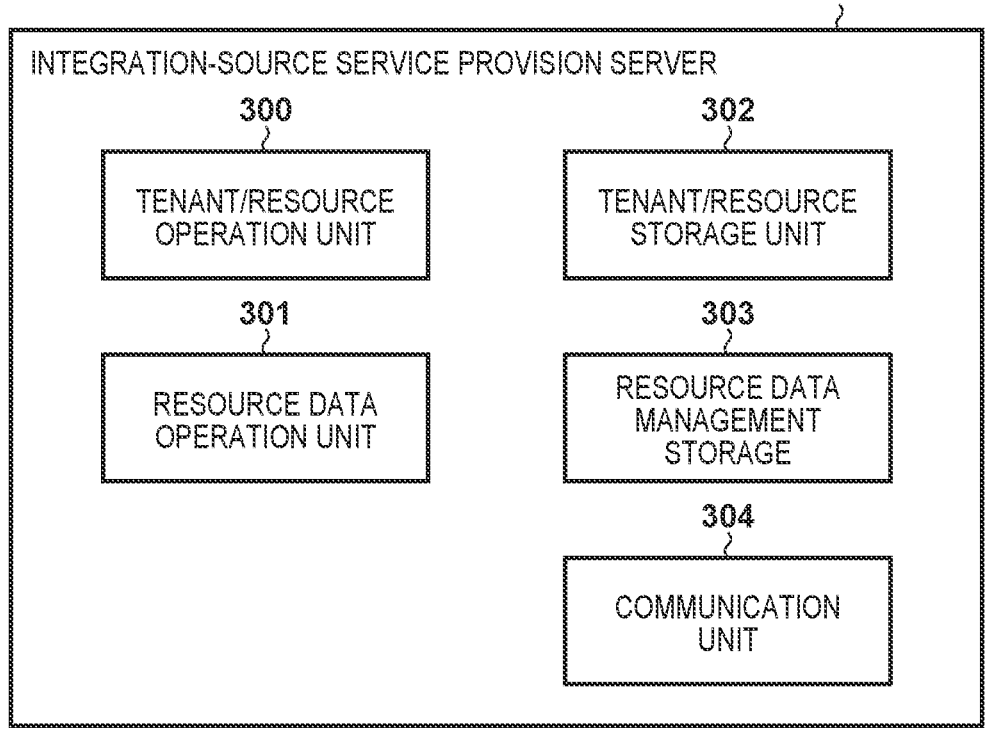
FIG. 3 is a block diagram of the integration-source service provision server.

FIG. 3 is a block diagram showing an example of the functional arrangement of the integration-source service provision server 101. Each program of the integration-source service provision server 101 is implemented when the program is loaded from the RAM 201, the storage 202, secondary storage device 205, or the like and the CPU 200 executes the program. The integration-source service provision server accesses an external device via a network such as the integration execution server 103 or the like through the network interface 204.

The integration-source service provision server 101 manages tenant management information as shown in Example 1, resource management information as shown in Example 2, and resource data management information as shown in Example 3 in a tenant resource storage unit 302. The actual files of resource data are held in a resource data management storage 303.

The integration-source service provision server 101 also receives an operation instruction from a communication unit 304 and accesses the tenant resource storage unit 302 via a tenant resource operation unit 300 to obtain or update the tenant management information, the resource management information, or the resource data management information. Alternatively, the integration-source service provision server receives an operation instruction from the communication unit 304 and accesses the resource data management storage 303 via a resource data operation unit 301 to obtain the actual file of the resource data.

Figure 4:
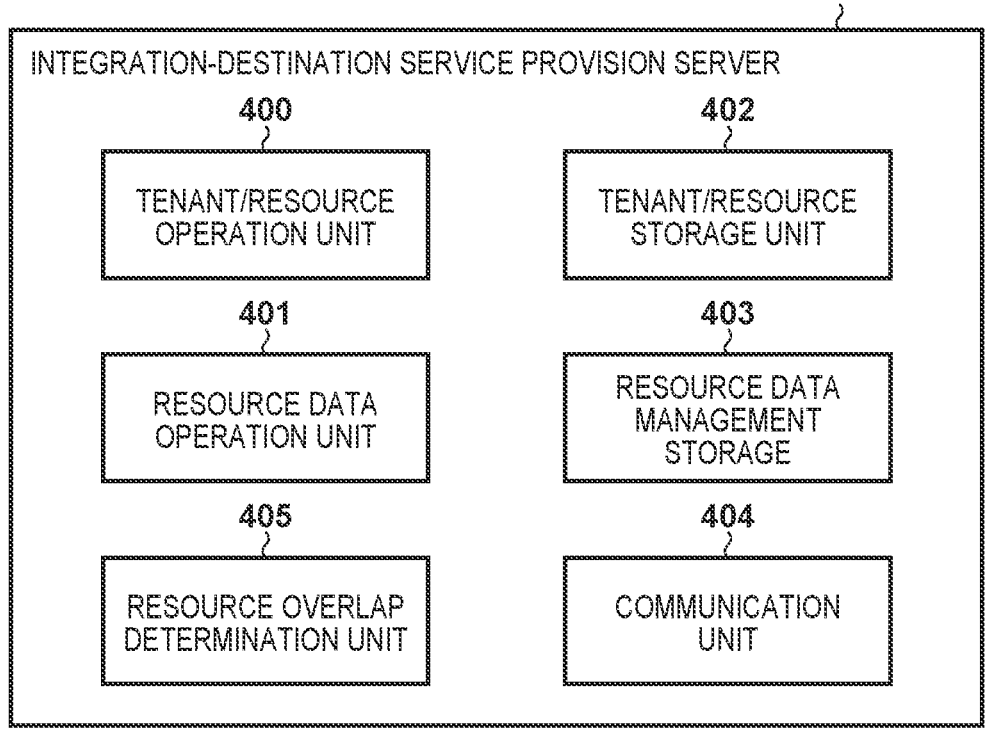
FIG. 4 is a block diagram of the integration-destination service provision server.

FIG. 4 is a block diagram showing an example of the functional arrangement of the integration-destination service provision server 102. Each program of the integration-destination service provision server 102 is implemented when the program is loaded from the RAM 201, the storage 202, or the secondary storage device 205 and the CPU 200 executes the program. The integration-destination service provision server accesses an external device via a network such as the integration execution server 103 or the like through the network interface 204.

The integration-destination service provision server 102 manages tenant management information as shown in Example 1, resource management information as shown in Example 2, and resource data management information as shown in Example 3 in a tenant resource storage unit 402. In addition, the actual files of resource data are held in a resource data management storage 403.

The integration-destination service provision server 102 also receives an operation instruction from a communication unit 404 and accesses the tenant resource storage unit 402 via a tenant resource operation unit 400 to obtain or update the tenant management information, the resource management information, or the resource data management information. Alternatively, the integration-destination service provision server receives an operation instruction from the communication unit 404 and accesses the resource data management storage 403 via a resource data operation unit 401 to obtain the actual file of the resource data.

Note that a resource has a unique resource ID. When a piece of resource management information is to be written, a resource overlap determination unit 405 determines whether an overlapping unique resource ID is present and causes the write operation to fail if an overlapping unique resource ID is already present in the service. The information is not written in the failed write operation, and for example, an operation such as transmitting a message indicating the failure to the integration execution server 103 or the integration-source service provision server 101 or to both of these servers is performed.

Figure 5:
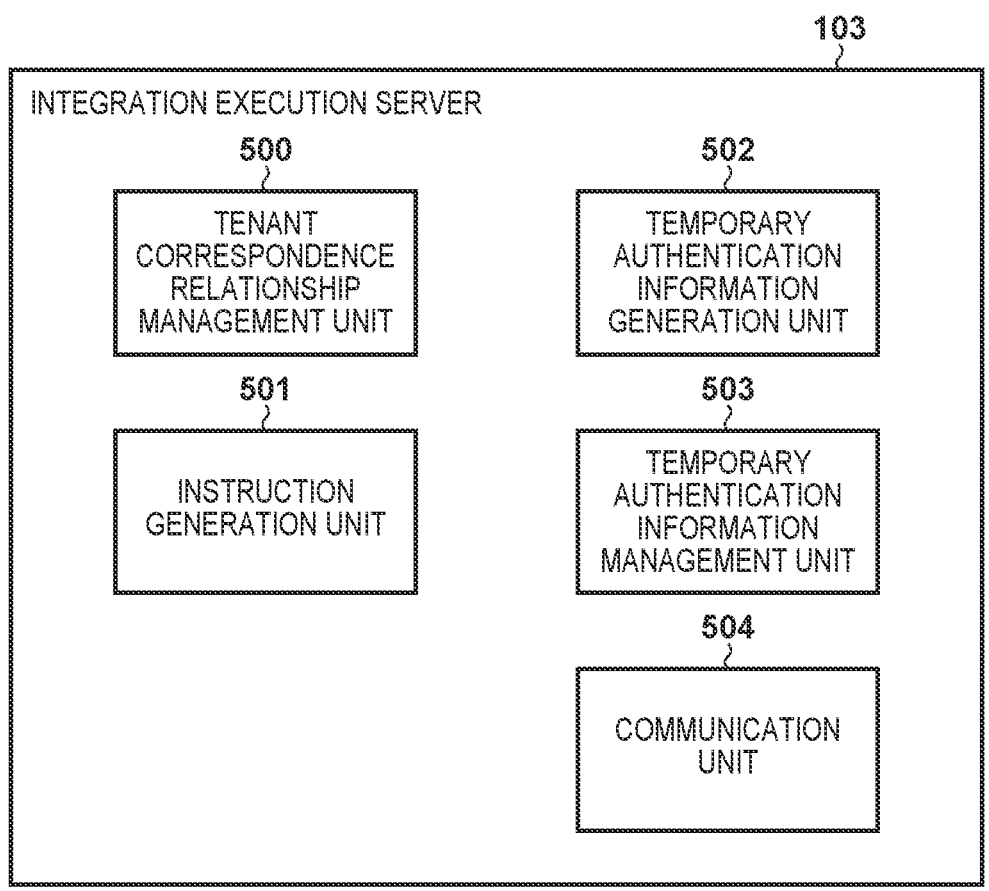
FIG. 5 is a block diagram of an integration execution server.

FIG. 5 is a block diagram showing an example of the functional arrangement of the integration execution server 103. Each program of the integration execution server 103 is implemented when the program is loaded from the RAM 201, the storage 202, or the secondary storage device 205, and the CPU 200 executes the program. The integration execution server accesses an external device via a network such as the integration-source service provision server 101, the integration-destination service provision server 102, or the like through the network interface 204.

The integration execution server 103 holds, in a tenant correspondence relationship management unit 500, each correspondence relationship between an integration-source tenant managed in the integration-source service provision server 101 and an integration-destination tenant managed in the integration-destination service provision server 102. This correspondence relationship may be automatically generated by linking the tenants based on the tenant IDs, the registered email addresses, address information, phone number information, or the like or be generated manually in advance. An example of the held correspondence relationship is shown below.

Example 4. Example of Held Integration Source/Destination Correspondence Relationship

| Integration-Source Tenant | Integration-Destination Tenant |
|---|---|
| BEF001 | AFTOOA |
| BEF002 | AFTOOB |
| ⋮ | ⋮ |

Each correspondence relationship between the tenants is specified by associating the tenant ID of the integration-source tenant and the tenant ID of the integration-destination tenant as shown in this example.

Service integration from the integration-source service provision server 101 to the integration-destination service provision server 102 is executed by (i) causing the instruction generation unit 501 to generate instructions to the integration-source service provision server 101 and the integration-destination service provision server 102 and (ii) transmitting the generated instructions via a communication unit 504.

If resource generation, which is executed for integration, fails in the integration-destination service provision server 102 due to an overlapping unique resource ID in the integration-destination service, the integration-source resource will be set in an integration standby state without immediately executing the integration to the existing resource. That is, the integration is put on hold. In regard to the integration-source resource that was set in the integration standby state, a list of resources which are set in the integration standby state can be generated, and the resource management information of this integration-source resource may be registered in this list to indicate that it is set in the integration standby state. When the integration-source resource is set in the standby state, temporary authentication information is generated by a temporary authentication information generation unit 502, and the administrator of the integration-destination tenant is notified of this temporary authentication information. The generated temporary authentication information is managed in a temporary authentication information management unit 503. The integration operation that was set in the standby state is executed (or restarted) when the temporary authentication information is input in the integration-destination tenant. Note that integration standby or standby state may also be referred to as integration preparation or preparation state. Furthermore, the integration standby state may also be managed with respect to the integration-source resource instead of the integration-destination resource.

Service Integration Processing

Figure 6:
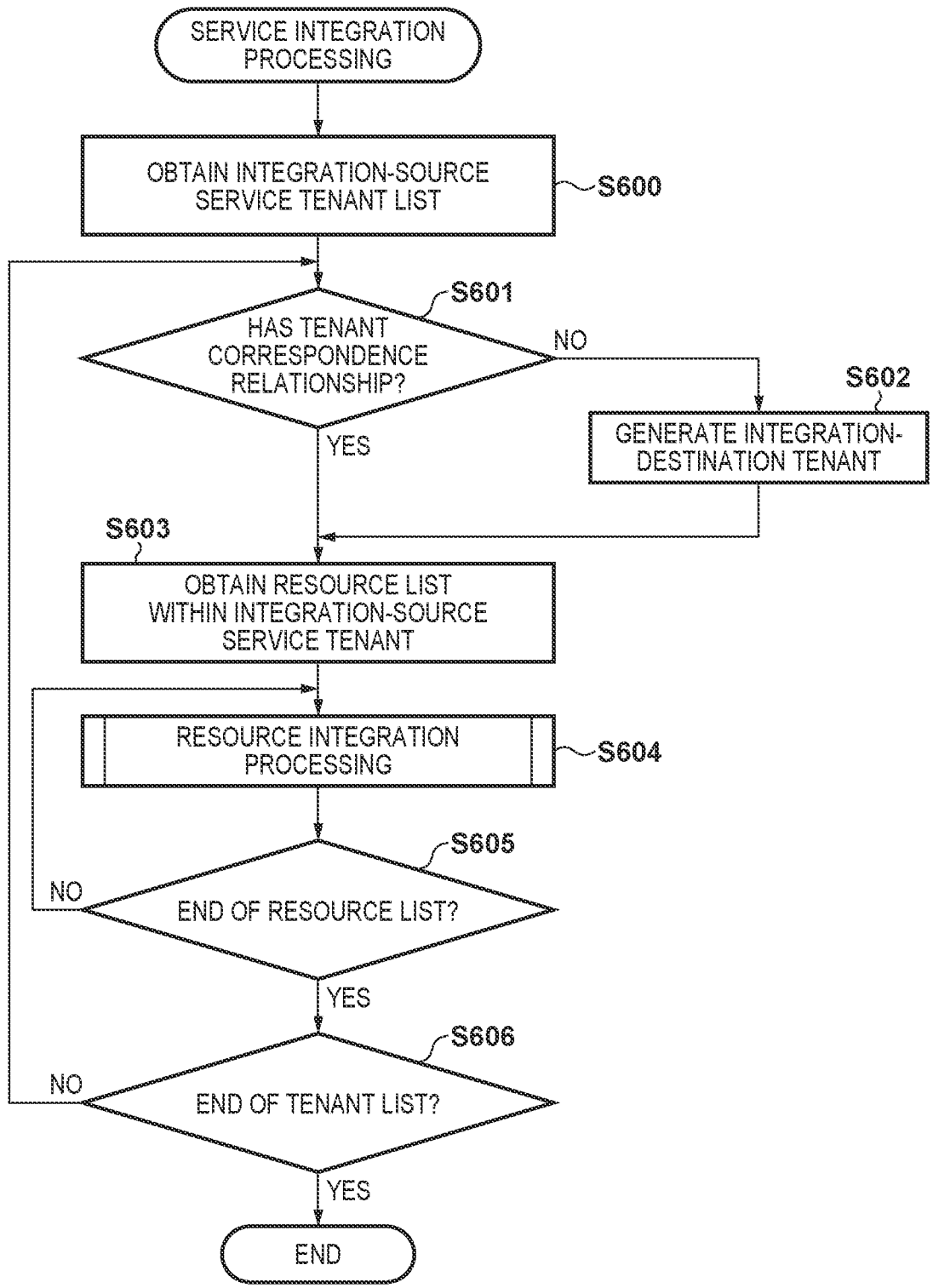
FIG. 6 is a flowchart of service integration processing according to the first embodiment.

FIG. 6 is a flowchart showing the procedure of the service integration processing by the integration execution server 103. The integration execution server 103 obtains the tenant list of the integration-source tenant by causing the instruction generation unit 501 to generate an instruction to obtain the tenant list of the integration-source tenant and transmitting the generated instruction to the integration-source service provision server 101 (step S600). Note that an obtainment instruction can also be referred to as a request. This also applies to other parts of this specification in a similar manner.

Processing is performed below on a target tenant by sequentially setting, as a target, each tenant included in the obtained integration-source tenant list. Assume that an integration-source tenant which is being processed is the target integration-source tenant of the integration-source tenant list.

The tenant correspondence relationship management unit 500 determines whether the target integration-source tenant has a tenant correspondence relationship (step S601). That is, the presence/absence of a migration-destination tenant corresponding to a target migration-source tenant is determined. If a correspondence relationship is present, the tenant written as having the correspondence relationship, that is, the corresponding tenant of the integration-destination service will be referred to as the integration-destination tenant. If a correspondence relationship is absent, the instruction generation unit 501 will generate a tenant generation instruction for the integration-destination service, and the generated instruction will be transmitted to the integration-destination service provision server 102. The integration-destination service provision server 102 generates a new tenant in response to this instruction and sets this generated tenant as the integration-destination tenant (step S602). When the tenant generation instruction is to be transmitted in step S602, the integration execution server 103 can, for example, associate the target integration-source tenant with the tenant generated in step S602 and store the correspondence relationship between these tenants in the tenant correspondence relationship management unit 500. As a result, the integration-destination tenant corresponding to the integration-source tenant is always present in the integration-destination service during the integration processing. Note that this association may be performed after the generation of the tenant has been confirmed in response to the tenant generation instruction.

Next, the instruction generation unit 501 generates an instruction to obtain the resource list of the target integration-source tenant and transmits the generated instruction to the integration-source service provision server 101. In response to the resource list obtainment instruction, the integration-source service provision server 101 transmits, as a response, the resource list of the target integration-source tenant. The integration execution server 103 obtains the resource list of the target integration-source tenant in this manner (step S603).

Figure 7:
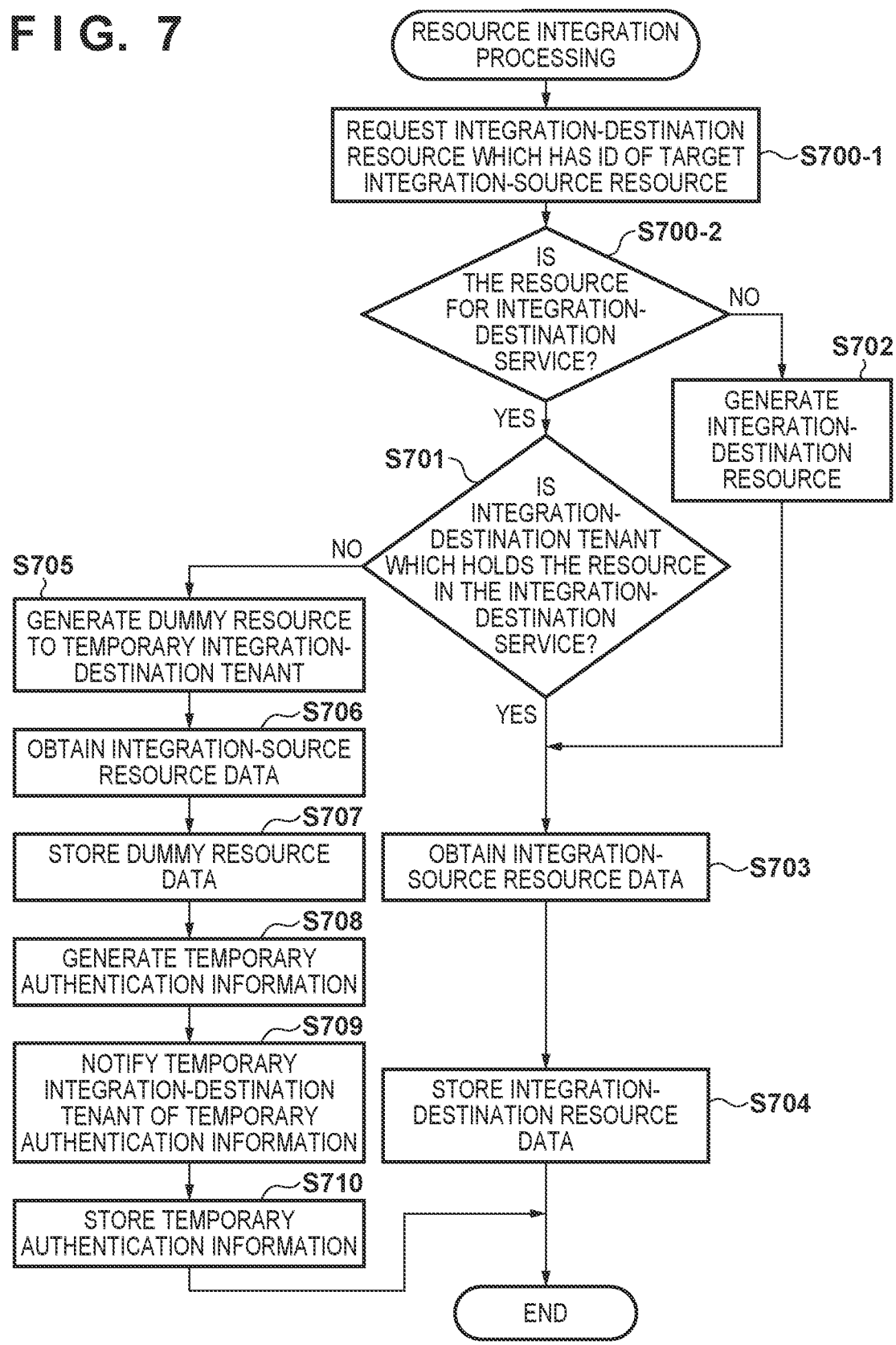
FIG. 7 is a flowchart of resource integration processing according to the first embodiment.

Processing is performed below on a target resource by sequentially setting, as a target, each resource included in the obtained integration-source resource list. Assume that an integration-source resource which is being processed is the target integration-source resource of the integration-source resource list. Resource integration processing is executed for the target integration-source resource (step S604). The details of the resource integration processing are shown in FIG. 7. The process of step S604 is repetitively performed on all of the resources included in the resource list by sequentially setting each resource as a target (step S605), and the processes of steps S601 to S605 are repetitively performed on all of the tenants included in the tenant list by sequentially setting each tenant as a target (step S606).

FIG. 7 is a flowchart showing the procedure of the resource integration processing (step S604) which appears during the procedure of the service integration processing by the integration execution server 103 of FIG. 6.

The instruction generation unit 501 generates an integration-destination resource obtainment instruction and transmits the generated instruction to the integration-destination service provision server 102 (step S700-1). At this time, the unique resource ID of the target integration-source resource is designated as the ID of the resource to be obtained. Note that the resource to be obtained here can be the resource management information. If a corresponding resource is present, for example, its resource management information is transmitted as a response. Otherwise, a response indicating that the corresponding resource is absent is transmitted. Whether a resource, of the integration-destination service, which has the designated unique resource ID of the target integration-source resource has been obtained is determined (step S700-2). If it is determined that the resource could not be obtained, the instruction generation unit 501 generates a resource generation instruction for the integration-destination service, and the generated instruction is transmitted to the integration-destination service provision server 102. As a result, a new resource is generated in the integration-destination tenant (step S702). At this time, the unique resource ID of the target integration-source resource is designated as the ID of the resource to be generated. In addition, the integration-destination tenant is designated as the tenant to which the resource to be generated belongs. The generated resource is the integration-destination resource that corresponds to the target integration-source resource. Note that although resources can include those that include hardware, assume here that a logical or virtual resource will be addressed here.

Subsequently, the instruction generation unit 501 generates a resource data obtainment instruction for the target integration-source resource and transmits the generated instruction to the integration-source service provision server 101 to obtain the resource data of the target integration-source resource (step S703). The instruction generation unit 501 generates an instruction to store the resource data of the integration-destination resource and transmits the generated instruction together with the resource data of the obtained target integration-source resource to the integration-destination service provision server 102. At this time, the integration-destination resource ID to which the resource data is to be associated is designated. The integration-destination service provision server 102 that received the instruction and the resource data stores the received resource data of the integration-source resource as the resource data (step S704).

The processes of steps S703 and S704 can be said to be processes for directly migrating the data of the integration-source resource to the integration-destination resource.

Note that the process may advance to step S701 instead of step S703 after the process of step S702. Even if the processing procedure is arranged in this way, the process will ultimately branch to step S703 because the determination result of step S701 is affirmative.

If it is determined in step S700-2 that the resource of the integration-destination service which has the same unique resource ID as the target integration-source resource has been obtained, the resource obtained in step S700-1 will be set as the integration-destination resource, and the tenant which holds the integration-destination resource will be confirmed (step S701). The tenant which holds the integration-destination resource can be confirmed by referring to the tenant ID included in the received resource management information.

If it is determined that the tenant which holds the integration-destination resource is the integration-destination tenant (YES—step S701), the target integration-source resource is integrated with this integration-destination resource. Hence, the instruction generation unit 501 generates an instruction to obtain the resource data of the target integration-source resource. Transmitting this instruction to the integration-source service provision server 101 allows the resource data of the target integration-source resource to be obtained as a response (step S703). The instruction generation unit 501 generates an instruction to store the resource data of the integration-destination resource, and the generated instruction is transmitted together with the obtained resource data of the target integration-source resource to the integration-destination service provision server 102 to store the resource data as the resource data of the integration-destination resource (step S704). The integration-destination resource ID to which the resource data is to be associated is designated by the resource data storage instruction.

If it is determined that the tenant which holds the integration-destination resource is not the integration-destination tenant (NO—step S701), the integration processing with respect to the target integration-source resource is put on hold, and the integration-destination resource is set as the standby integration-destination resource. That is, the integration-destination resource is set in an integration standby state. To implement this state, the resource management information of the integration-destination resource obtained in step S700-1 can be registered in an integration standby state list or be associated with information for indicating the standby state. The tenant which holds the standby integration-destination resource is referred to as a standby integration-destination tenant. In addition, the integration-destination tenant is referred to as a temporary integration-destination tenant. The state in which the integration standby state is state is also referred to as "in standby" or "on hold". Furthermore, the target integration-source resource whose integration-destination resource has been set in the standby state may be referred to as a standby integration-source resource. The integration execution server 103 generates a dummy resource in the temporary integration-destination tenant, link the resource data to the dummy resource, and perform processing to set the integration with the standby integration-destination resource in a standby state from the dummy resource (steps S705 to S710). The details of this process will be described next.

The instruction generation unit 501 generates a resource generation instruction to the integration-destination service and transmits the generated instruction to the integration-destination service provision server 102 to generate a resource in the temporary integration-destination tenant (step S705). At this time, a unique resource ID which does not overlap in the integration-destination service is designated as the resource ID of this resource to be generated. The generated resource is referred to as a dummy resource. An example of the dummy resource management information is shown below.

Example 5. Dummy Resource Management Information

```
{
    "ResourceID": "DMYxXio3qjA",
    "TenantId": "AFT000A",
    "ResourceName": "",
    "ProductName": "",
    "ResourceType": "",
}
```

In this manner, the dummy resource management information includes the resource ID, the tenant ID, the resource name, the product name, and the resource type. The tenant ID is the ID of the temporary integration-destination tenant. The resource name, the product name, and the resource type can be the resource name, the product name, and the resource type designated in the resource generation instruction. The resource name, the product name, and the resource type to be designated can be, for example, those of the corresponding integration-source resource. Since the resource ID of the target integration-source resource is held by the standby integration-destination resource in the integration-destination service, an ID which is different from the resource ID of the target integration-source resource is added to the dummy resource. As a result, it is impossible to directly associate the target integration-source resource and the dummy resource based on the resource ID. Hence, when a dummy resource is to be generated, information which indicates that this resource is a dummy resource and information which indicates the association with the standby integration-destination resource that caused the dummy resource to be generated are stored.

The instruction generation unit 501 generates an instruction to obtain the resource data of the target integration-source resource, and the generated instruction is transmitted to the integration-source service provision server 101. The integration-source service provision server 101 obtains the resource data of the corresponding integration-source resource and transmits the obtained resource data as a response to the integration execution server 103 (step S706). The instruction generation unit 501 generates an instruction to store the resource data of the dummy resource, and the generated instruction is transmitted together with the obtained resource data to the integration-destination service provision server 102. The integration-destination service provision server 102 stores the received resource data as the resource data of the dummy resource (step S707). Since the dummy resource is a resource that is temporarily or provisionally generated, it may also be referred to as a provisional resource. The temporary authentication information generation unit 502 generates temporary authentication information that links the temporary integration-destination tenant, the standby integration-destination tenant, and the unique resource ID of the target integration-source resource (step S708). To reiterate, the temporary integration-destination tenant is the tenant of the integration-destination service linked to the target integration-source tenant. The standby integration-destination tenant is the tenant of the integration-destination service that holds the resource (the standby integration-destination resource) which has the same ID as the target integration-source resource.

The administrator of the temporary integration-destination tenant is notified (step S709) of the temporary authentication information (to be also simply referred to as recognition information) here. Not only the temporary authentication information, but also a message which notifies the administrator of the occurrence of a standby state may also be transmitted together here. Note that since the temporary integration-destination tenant is the tenant to which the integration-source tenant is integrated or to which the resource is migrated from the integration-source tenant, the notification may be transmitted to the administrator of the integration-source tenant. Alternatively, a message indicating that a standby state occurred in the integration processing and inquiring the continuation of the processing may be transmitted as a notification to the administrator before the temporary authentication information, and the temporary authentication information may be transmitted to the administrator when the administrator has instructed the continuation of the integration.

The generated temporary authentication information is stored in the temporary authentication information management unit 503 (step S710). An example of the management information of the temporary authentication information is shown below. The address of the administrator of the tenant may be an address registered in advance. Alternatively, the information may be transmitted to the integration-destination service provision server 102 of the temporary integration-destination tenant and be transferred or distributed to a terminal or the like of the administrator.

Example 6. Example of Management Information of Temporary Authentication Information According to First Embodiment

| Standby Integration Destination Tenant | Temporary Authentication Information | Temporary Integration Destination Tenant | Unique Resource ID |
|---|---|---|---|
| AFT0042 | Lig432hfhew84GtO | AFT0022 | RSC0009 |
| AFT0090 | P46JLolmEh6G65d2 | AFT0045 | RSC0025 |

Note that resources that have the same combination of the temporary integration-destination tenant and the standby integration-destination tenant may have the same temporary authentication information regardless of the values of the respective unique resource IDs.

The procedure shown in FIG. 7 allows an integration-source resource to be integrated with (or migrated to) an integration-destination resource when the integration-destination tenant includes the integration-destination resource. Also, when the integration-destination service does not include the integration-destination resource, an integration-destination resource can be newly generated, and the integration-source resource can be integrated with the newly generated integration-destination resource. On the other hand, when the integration-destination resource belongs to a tenant which is not the integration-destination tenant, the integration processing with respect to this integration-source resource can be set in a standby state upon setting the temporary authentication information.

Figure 8:
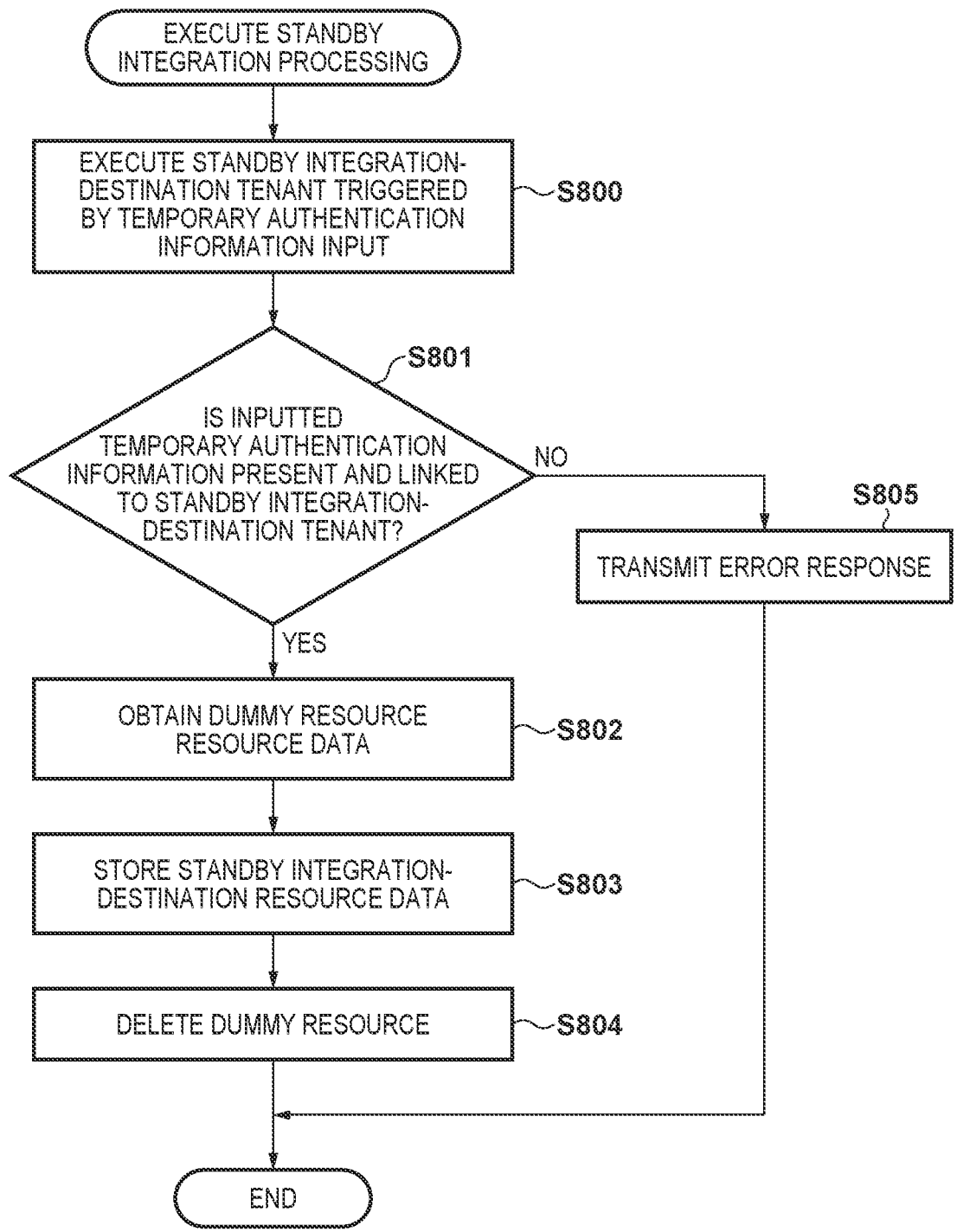
FIG. 8 is a flowchart of the execution of standby integration processing according to the first embodiment.

FIG. 8 is a flowchart showing the processing procedure when integration of resources which were set in an integration standby state in the resource integration processing of FIG. 7 is to be executed. The administrator of the temporary integration-destination tenant has been notified of the temporary authentication information based on the process of step S709 of FIG. 7. When this temporary authentication information is input to the standby integration-destination tenant, authentication is given to the integration processing which is on hold, and the integration processing is restarted. The processing of FIG. 8 is executed by the integration execution server 103.

Figure 12A:
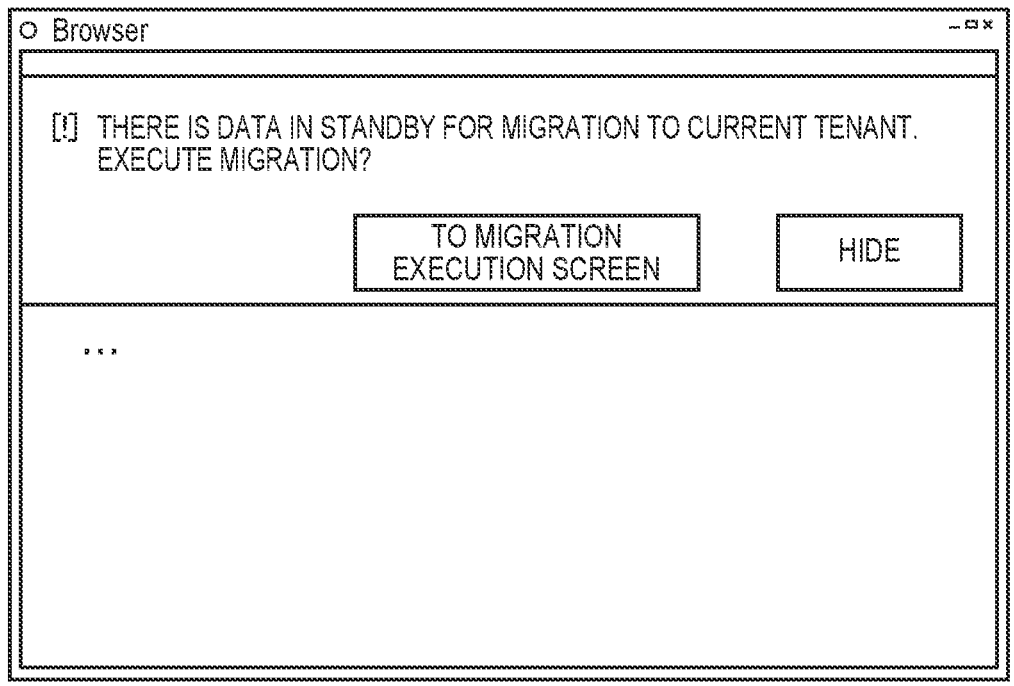
FIGS. 12A and 12B are views each showing a sample of a migration screen.
Figure 12B:
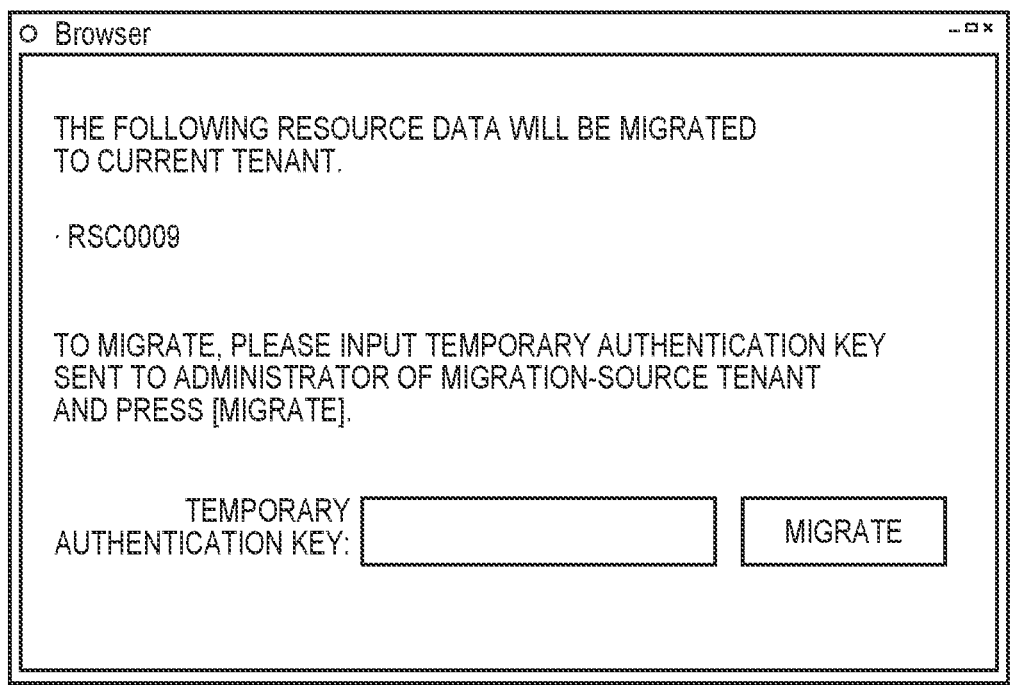

In FIG. 8, the execution of the integration processing in standby is triggered when a user of the standby integration-destination tenant transmits the temporary authentication information of which the temporary integration-destination tenant was notified in step S709 (step S800). The transmission of the temporary authentication information in step S800 may be performed on the screen of the terminal of the integration-destination service provision server 102 which was logged in as the user of the standby integration-destination tenant. FIGS. 12A and 12B show examples of a management screen. FIG. 12A shows an example of the display of the migration information on the screen after the standby integration-destination tenant has logged in. This screen is displayed when a tenant of a logged in user is determined to be set as a standby integration-source tenant by performing a determination by referring to the management information of the temporary authentication information. In addition, FIG. 12B shows an example of a temporary authentication information transmission screen of the standby integration-destination tenant. This screen is displayed when, for example, a "Go to Migration Execution Screen" button shown in FIG. 12A is touched. Note that if there are a plurality of resources that correspond to the input temporary authentication information, the integration of the plurality of resources may be continuously executed. The temporary authentication information and its management information are stored in the integration execution server 103. Hence, in step S800, to determine whether the tenant of the logged in user is a standby integration-destination tenant, a determination can be performed by referring to the integration execution server 103 or by obtaining the management information. Note that although FIG. 12B shows that the temporary authentication information (temporary authentication key) has been transmitted to the administrator of the migration-source tenant, this indicates that the temporary authentication information has been transmitted to the administrator of the standby integration-source tenant as described in step S709.

Whether the temporary authentication information input on the screen of FIG. 12B is present and linked to the standby integration-destination tenant is determined (step S801). This determination is also performed by referring to the management information of the temporary authentication information. If the temporary authentication information is absent, an input error will be determined, an error response will be transmitted (step S805), and the integration processing in standby will end without being executed. If the input temporary authentication information is determined to be present and linked to the standby integration-destination tenant (YES—step S801), it will be determined that the authentication for restarting the integration processing between the temporary integration-destination tenant as the notification destination and the standby integration-destination tenant which received the input has succeeded. In such a case, the integration processing in standby (steps S802 to S804) is executed.

The resource data of the dummy resource is obtained (step S802) by causing the instruction generation unit 501 to generate an instruction to obtain the resource data of the dummy resource and transmitting the generated instruction to the integration-destination service provision server 102. The instruction generation unit 501 generates an instruction to store the resource data of the standby integration-destination resource, the generated instruction is transmitted together with the resource data of the dummy resource to the integration-destination service provision server 102, and the resource data is stored as the resource data of the standby integration-destination resource (step S803). Subsequently, the instruction generation unit 501 generates a dummy resource delete instruction, and the generated instruction is transmitted 1 to the integration-destination service provision server 102 to delete the dummy resource (step S804). At this time, together with the deletion of the dummy resource, the management information of the dummy resource may be deleted. Furthermore, the resource data linked to the dummy resource may also be deleted. It can be said that the processing which reaches the processes of steps S802 and S803 upon undergoing the processes of steps S705 to S710 is processing for migrating the data of an integration-source resource to an integration-destination resource via a dummy resource.

In this embodiment, according to the arrangements and the processes described above, if a resource overlap occurs during data integration between services, resource integration will be put on hold by setting the resource in a standby state, and the integration will be executed when authentication can be confirmed between the tenants before and after the integration. This allows service integration to be performed smoothly even when the tenant structures are different.

Furthermore, the tenants and the data of resources can be integrated based on the correspondence relationship between the services. In addition, overlap in resources before and after the integration can be solved based on the correspondence relationship between the tenants. More specifically, when a resource ID overlap occurs in the integration-destination service, the integration can be executed smoothly if there is a correspondence relationship between the tenant that holds the existing resource and the tenant that holds the integration-source resource. Concurrently, if there is no correspondence relationship between the tenant that holds the existing resource and the tenant that holds the integration-source resource, it will be possible to prevent data leakage by not executing the integration.

More specifically, when a tenant to which the integration-destination resource corresponding to the integration-source resource belonging to the integration-source tenant belongs differs from the integration-destination tenant, integration processing of the resources is performed upon authentication. Also, in such a case, although the authentication information is transmitted to the user of the integration-destination tenant, input of the authentication information is performed in the tenant to which the integration-destination resource belongs. Hence, in such a case, it may be difficult for the authentication to be performed based on the unique determination of the user of the integration-destination tenant, and it will require monitoring and agreement of the user of the tenant to which the integration-destination resource belongs. That is, the integration of the resources is executed substantially only when the authentication of both the user of the integration-destination tenant and the user of tenant to which the integration-destination resource belongs has been received. As a result, the security during tenant integration can be improved.

Furthermore, by generating a dummy resource, it is unnecessary to refer to the resource or the resource data of the integration-source tenant to restart the integration processing when the integration processing is set in a standby state. That is, once integration processing is performed, the integration-source tenant would become unnecessary even if there is a resource to be set in an integration standby state, thereby increasing the options of measures including suspension of the integration.

Second Embodiment

The second embodiment differs from the first embodiment in the behavior (processing) for setting an integration standby state when an overlap in unique resource IDs occurs while a resource is being newly generated during resource integration. The first embodiment coped with such a case by integrating the resources by generating a dummy resource in a temporary integration-destination tenant in the integration-destination service and setting a state in which integration from the dummy resource of the temporary integration-destination tenant to the integration-destination resource of a standby integration-destination tenant is in a standby state.

In contrast, in the second embodiment, temporary integration is not performed, that is, the dummy resource is not generated. Instead, integration from the integration-source tenant to the standby integration-destination tenant is set in a standby state while the data is held by the integration-source tenant in the integration-source service.

Using the mode of the first embodiment allows all of the data in the integration-source service including that during the standby state to be migrated to the integration-destination service. Hence, the integration-source service can be stopped immediately after the integration. As a result, the management operation cost can be reduced.

On the other hand, using the mode of the second embodiment reduces the integration execution time because the data migration amount during the integration decreases. Considering a case which the service is stopped to prevent mismatching of data during integration, it can be seen that the integration execution time directly becomes a service downtime. Therefore, there is an advantage in reducing the integration execution time. In the second embodiment hereinafter, only parts different from those of the first embodiment is described.

Figure 9:
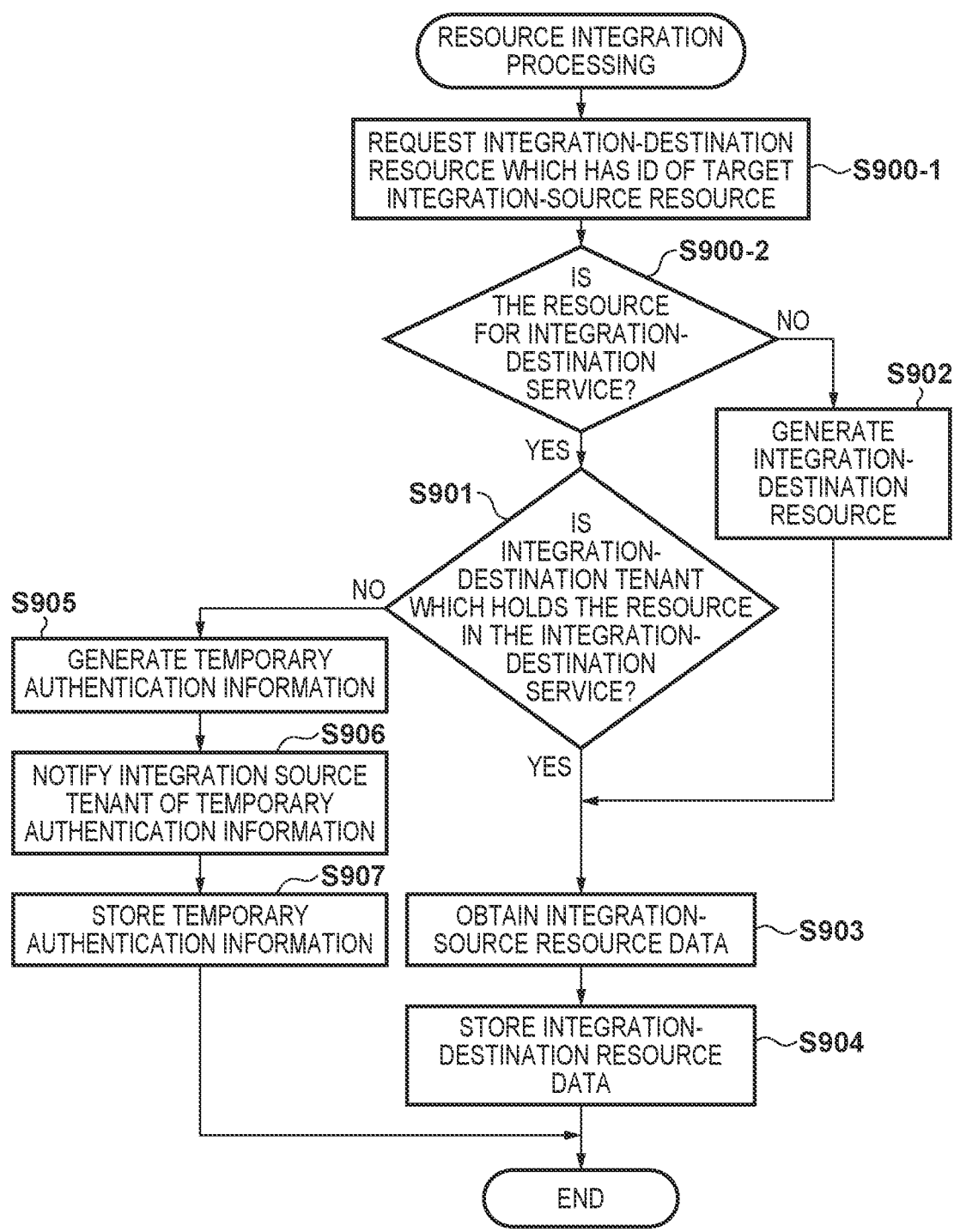
FIG. 9 is a flowchart of resource integration processing according to the second embodiment.

FIG. 9 is a flowchart showing the procedure of resource integration processing (step S604) which appeared in the procedure of service integration processing by an integration execution server 103 shown in FIG. 6. In this embodiment, the procedure of FIG. 9 is executed instead of the procedure of FIG. 7 of the first embodiment.

An instruction generation unit 501 generates an integration-destination resource obtainment instruction, and the generated instruction is transmitted to an integration-destination service provision server 102 (step S900-1). At this time, the unique resource ID of the integration-source resource is designated as that of the resource to be obtained. As a result, if a corresponding resource is present, for example, the resource management information of this resource is transmitted as a response. If a corresponding resource is absent, a message indicating that a corresponding resource is absent is transmitted as a response.

Whether a resource in the integration-destination service which holds the unique resource ID of the target integration-source resource has been obtained is determined (step S900-2). If a resource has been obtained, the instruction generation unit 501 generates an instruction to generate a resource in the integration-destination service, and the generated instruction is transmitted to the integration-destination service provision server 102. As a result, a resource is generated in the integration-destination tenant (step S902). At this time, the unique resource ID of the target integration-source resource is designated for the resource to be generated. The generated resource is set as the integration-destination resource. Subsequently, the instruction generation unit 501 generates an instruction to obtain the resource data of the target integration-source resource, and the generated instruction is transmitted to an integration-source service provision server 101 to obtain the resource data of the target integration-source resource (step S903). The instruction generation unit 501 generates an instruction to store the resource data of the integration-destination resource, and the generated instruction is transmitted to the integration-destination service provision server 102 to store the obtained resource data as the resource data of the integration-destination resource (step S904).

If a resource in the integration-destination service which holds the unique resource ID of the target integration-source resource is obtained (YES—step S900-1), the obtained resource will be set as the integration-destination resource and the tenant which holds the integration-destination resource will be confirmed (step S901).

If the tenant that holds the integration-destination resource is the integration-destination tenant (YES—step S901), the instruction generation unit 501 will generate an instruction to obtain the resource data of the integration-source resource. This generated instruction is transmitted to the integration-source service provision server 101 to obtain the resource data of the integration-source resource (step S903). The instruction generation unit 501 generates an instruction to store the resource data of the integration-destination resource, and the generated instruction is transmitted to the integration-destination service provision server 102 to store the obtained resource data as the resource data of the integration-destination resource (step S904). Note that the processes of steps S900-1 to S904 are the same processes as those of steps S700-1 to S704 of FIG. 7.

Note that the process may advance to step S901 instead of step S903 after the process of step S902. Even if the processing procedure is arranged in this way, the process ultimately branches to step S903 because the determination result of step S901 is affirmative.

On the other hand, if the tenant that holds the integration-destination resource is not the integration-destination tenant (NO—step S901), the integration-destination resource is set as a standby integration-destination resource. In addition, the tenant that holds the standby integration-destination resource is set as a standby integration-destination tenant.

Processing (steps S905 to S907) to set the integration from the target integration-source resource to the standby integration-destination resource in a standby state is performed.

A temporary authentication information generation unit 502 generates temporary authentication information which links the integration-source tenant, the standby integration-destination tenant, and the unique resource ID of the integration-source resource (step S905). The administrator of the target integration-source tenant is notified of the temporary authentication information (step S906). A temporary authentication information management unit 503 stores the generated temporary authentication information (step S907). Although the processes of steps S905 to S907 are mostly similar to those of steps S708 to S710 of FIG. 7, the point that the notification destination of the temporary authentication information in step S906 is the integration-source tenant differs from step S709.

An example the management information of the temporary authentication information is shown below. This example has been obtained by replacing the temporary integration-destination tenant of the management information of Example 6 with the integration-source tenant.

Example 7. Example of Management Information of Temporary Authentication Information According to Second Embodiment

| Standby Integration Destination Tenant | Temporary Authentication Information | Integration Destination Tenant | Unique Resource ID |
|---|---|---|---|
| AFT0040 | Lj8432hfhew84GtO | BFT0022 | RSC0014 |
| AFT0065 | P46JLolmEh6G65d2 | BFT0045 | RSC0030 |

Note that if the combinations of the integration-source tenant and the standby integration-destination tenant are the same, the temporary authentication information may be set as the same regardless of the values of the unique resource IDs.

Figure 10:
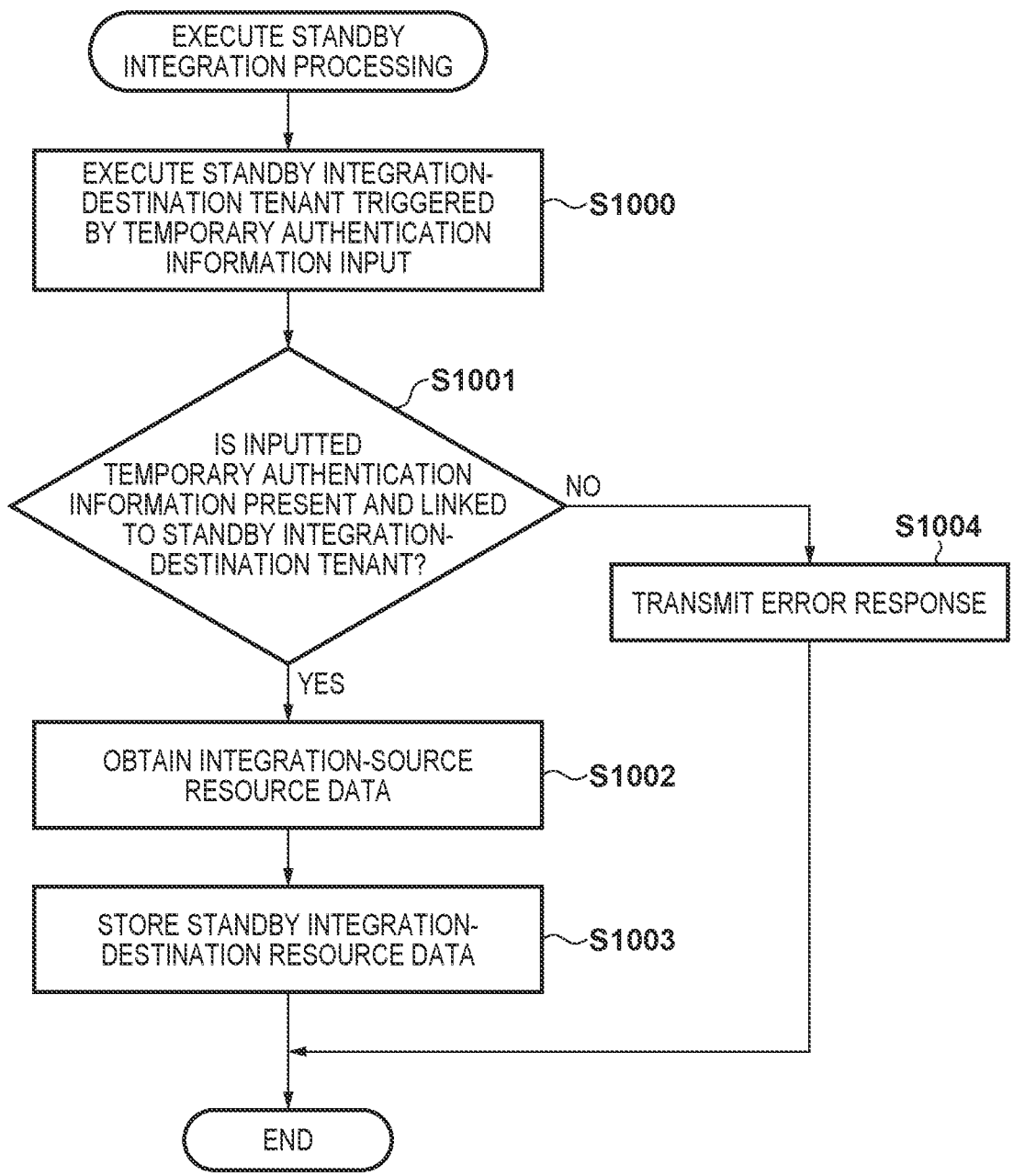
FIG. 10 is a flowchart of the execution of standby integration processing according to the second embodiment.

FIG. 10 is a flowchart showing the procedure of processing performed when integration of resources set in the integration standby state is to be executed in the resource integration processing of FIG. 9. The execution of the integration processing in standby is triggered (step S1000) when the user of the standby integration-destination tenant has transmitted, as a notification, the temporary authentication information to the integration-source tenant in step S906. The transmission can be performed on the screen on which login was performed as the user of the standby integration-destination tenant. FIG. 12A shows an example of the display of migration information on the screen after the standby integration-destination tenant has logged in. In addition, FIG. 12B shows an example of a temporary authentication information transmission screen of the standby integration-destination tenant. Note that if there are a plurality of resources corresponding to the input temporary authentication information, the integration of the plurality of resources may be executed continuously.

If the input temporary authentication information is determined to be neither present nor linked to the standby integration-destination tenant (step S1001), an input error is determined, an error response is transmitted (step S1004), and the integration processing in standby is ended without being executed. If the input temporary authentication information is determined to be present and linked to the standby integration-destination tenant (step S1001), it will be determined that the authentication of the target integration-source tenant as the notification destination and the standby integration-destination tenant in which the input occurred has succeeded, and the integration processing (steps S1002 and S1003) in the standby state will be executed. The instruction generation unit 501 generates an instruction to obtain the resource data of the target integration-source resource, and the generated instruction is transmitted to the integration-source service provision server 101 to obtain the resource data of the target integration-source resource (step S1002). The instruction generation unit 501 generates an instruction to store the resource data of the standby integration-destination resource, and the generated instruction is transmitted to the integration-destination service provision server 102 to store the obtained resource as the resource data of the standby integration-destination resource (step S1003).

The processing of FIG. 10 differs from that of FIG. 8 according to the first embodiment in the point that the obtainment source of the resource data is the target integration-source resource and in the point that there is no deletion of the dummy resource. Otherwise, the processes are the same.

According to the above-described embodiment, the processing time of the tenant integration processing can be reduced, and the tenant operating rate can be increased. Furthermore, it reduces the resources required by an integration-destination service provision server.

Other Embodiments

Although tenant integration processing has been shown as an example the first and second embodiments described above, the embodiments are similarly applicable also in tenant migration processing. In such a case, the term "integration" in the embodiments can be read as "migration". That is, an "integration-source service" can be read as a "migration-source service", and an "integration-destination service" can be read as a "migration-destination service". An "integration-source tenant" can be read as a "migration-source tenant", and an "integration-destination tenant" can be read as a "migration-destination tenant". Furthermore, an "integration-source resource" can be read as a "migration-source resource", and an "integration-destination resource" can be read as a "migration-destination resource".

Furthermore, "integration" according to the first and second embodiments can also be referred to as processing for integrating or aggregating tenants by, for example, migrating a plurality of migration-source tenants to a single migration-destination tenant.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064277, filed Apr. 5, 2021 which is hereby incorporated by reference herein in its entirety.

What is claimed is:

1. An information processing system that causes a migration-source tenant as a tenant of a migration-source service to migrate to a migration-destination tenant as a tenant of a migration-destination service corresponding to the migration-source tenant, the information processing system comprising one or more processors and one or more memories storing one or more programs to be executed by the one or more processors,
wherein the executed one or more programs cause the information processing system to:
determine whether the migration-destination tenant corresponding to the migration-source tenant is present or absent,
newly generate the migration-destination tenant when the migration-destination tenant is determined to be absent,
determine whether a migration-destination resource which has the same ID as a migration-source resource included in the migration-source tenant is included in the tenant of the migration-destination service,
newly generate the migration-destination resource in the migration-destination tenant when the migration-destination resource is determined not to be included in the tenant of the migration-destination service, and
migrate data of the migration-source resource to the migration-destination resource,
wherein to migrate includes
directly migrating the data of the migration-source resource to the migration-destination resource if the tenant including the migration-destination resource is the migration-destination tenant, and
migrating the data of the migration-source resource to the migration-destination resource via a dummy resource generated in the migration-destination tenant if the tenant including the migration-destination resource is not the migration-destination tenant.

2. The system according to claim 1, wherein to migrate includes setting data migration from the migration-source resource to the migration-destination resource in a standby state if the tenant including the migration-destination resource is not the migration-destination tenant.

3. The system according to claim 2, wherein to migrate includes transmitting a notification of the standby state to the migration-source tenant if the data migration is set in the standby state.

4. The system according to claim 3, wherein the notification further includes an inquiry as to whether the data migration set in the standby state is to be performed.

5. The system according to claim 4, wherein if the data migration is selected to be performed with respect to the inquiry, recognition information is transmitted to the migration-source tenant.

6. The system according to claim 3, wherein the notification further includes recognition information.

7. The system according to claim 5, wherein when the recognition information is input on a management screen of the tenant including the migration-destination resource of the data migration set in the standby state, the data migration of the migration-source resource set in the standby state is performed.

8. The system according to claim 2, wherein if the tenant including the migration-destination resource is not the migration-destination tenant, to migrate includes setting the data migration from the migration-source resource to the migration-destination resource in the migration-destination tenant after migrating the data of the migration-source resource to the dummy resource generated.

9. A method of an information processing system that migrates a migration-source tenant as a tenant of a migration-source service to a migration-destination tenant as a tenant of a migration-destination service corresponding to the migration-source tenant, the method comprising:
determining whether the migration-destination tenant corresponding to the migration-source tenant is present or absent;
newly generating the migration-destination tenant when the migration-destination tenant is determined to be absent;
determining whether a migration-destination resource which has the same ID as a migration-source resource included in the migration-source tenant is included in the tenant of the migration-destination service;
newly generating the migration-destination resource in the migration-destination tenant when the migration-destination resource is determined not to be included in the tenant of the migration-destination service;
directly migrating data of the migration-source resource to the migration-destination resource if the tenant including the migration-destination resource is the migration-destination tenant; and
migrating the data of the migration-source resource to the migration-destination resource via a dummy resource generated in the migration-destination tenant if the tenant including the migration-destination resource is not the migration-destination tenant.

* * * * *